J. W. CRAIN.
PLOW.
APPLICATION FILED SEPT. 26, 1912.

1,092,632.

Patented Apr. 7, 1914

2 SHEETS—SHEET 1.

Witnesses
Byron B. Collings
Oliver W. Holmes

Inventor
J. W. Crain,
by Wilkinson, Witherspoon
& MacKay,
his Attorneys

J. W. CRAIN.
PLOW.
APPLICATION FILED SEPT. 26, 1912.

1,092,632.

Patented Apr. 7, 1914.
2 SHEETS—SHEET 2.

Witnesses
Byron B. Collings.
Oliver W. Holmes.

Inventor
J. W. Crain,
by Wilkinson, Witherspoon
& MacKaye
his Attorneys

UNITED STATES PATENT OFFICE.

JOHN W. CRAIN, OF WINCHESTER, KENTUCKY, ASSIGNOR OF ONE-FOURTH TO VICTOR BLOOMFIELD, OF WINCHESTER, KENTUCKY.

PLOW.

1,092,632.     Specification of Letters Patent.     Patented Apr. 7, 1914.

Application filed September 26, 1912. Serial No. 722,549.

*To all whom it may concern:*

Be it known that I, JOHN W. CRAIN, a citizen of the United States, residing at Winchester, in the county of Clark and State of Kentucky, have invented certain new and useful Improvements in Plows; and I do hereby declare the following to be a full, clear, and exact description of the invention, such as will enable others skilled in the art to which it appertains to make and use the same.

My invention relates to improvements in plows, and it consists in the constructions, combinations and arrangements herein described and claimed.

An object of my invention is to provide an improved rotary plow adapted for efficient operation under all practical conditions, and provided with means for preventing injury or destruction of the plow blades by encountering stones or other obstructions.

A further object of my invention is to provide a strong and durable rotary plow which will operate advantageously in all characters of soils, and which can be adjusted to produce any desired depth of cut.

A further object of my invention is to provide an improved rotary plow, which can be readily adjusted to break up or disintegrate the soil to any desired extent.

Figure 1:
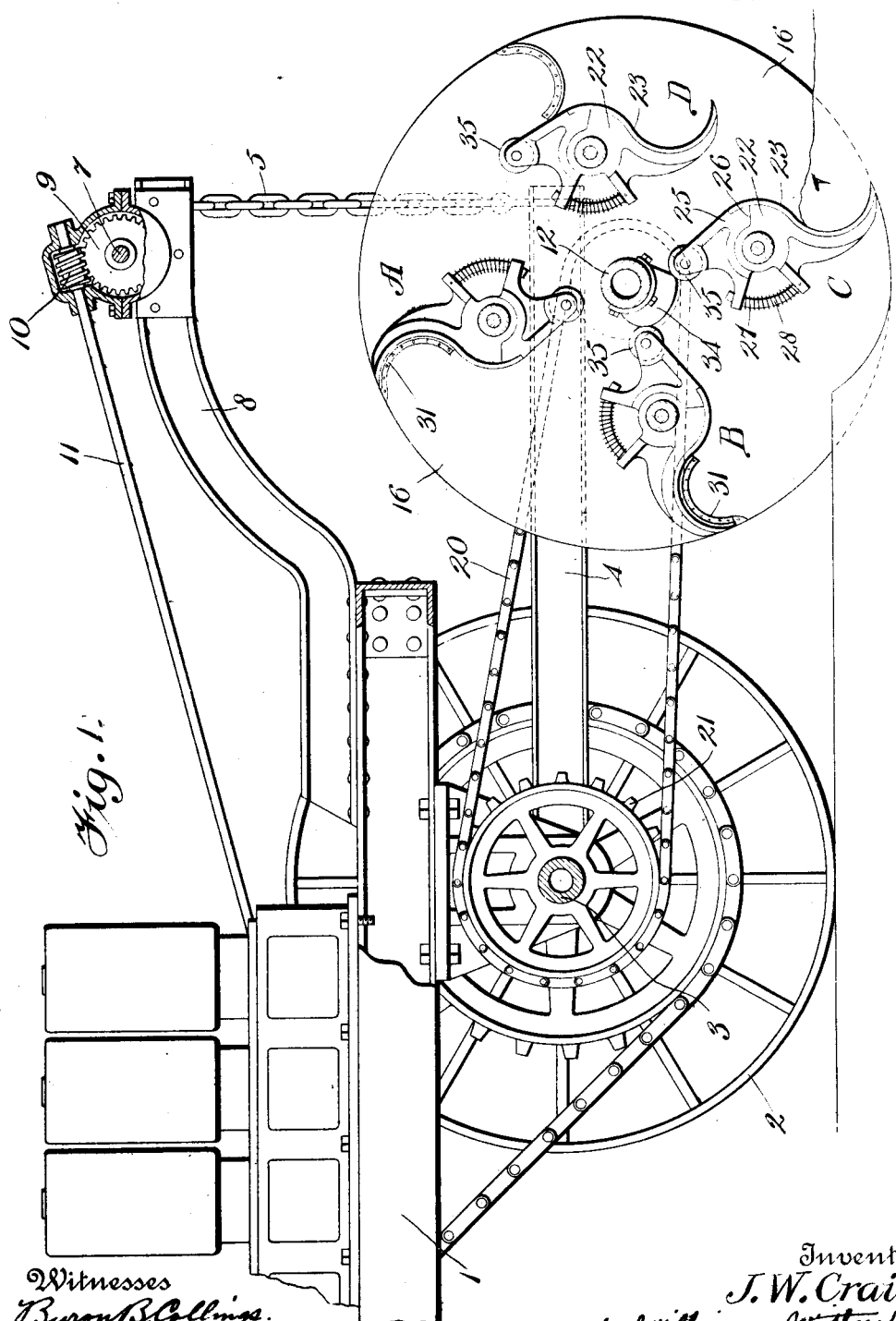
Figure 2:
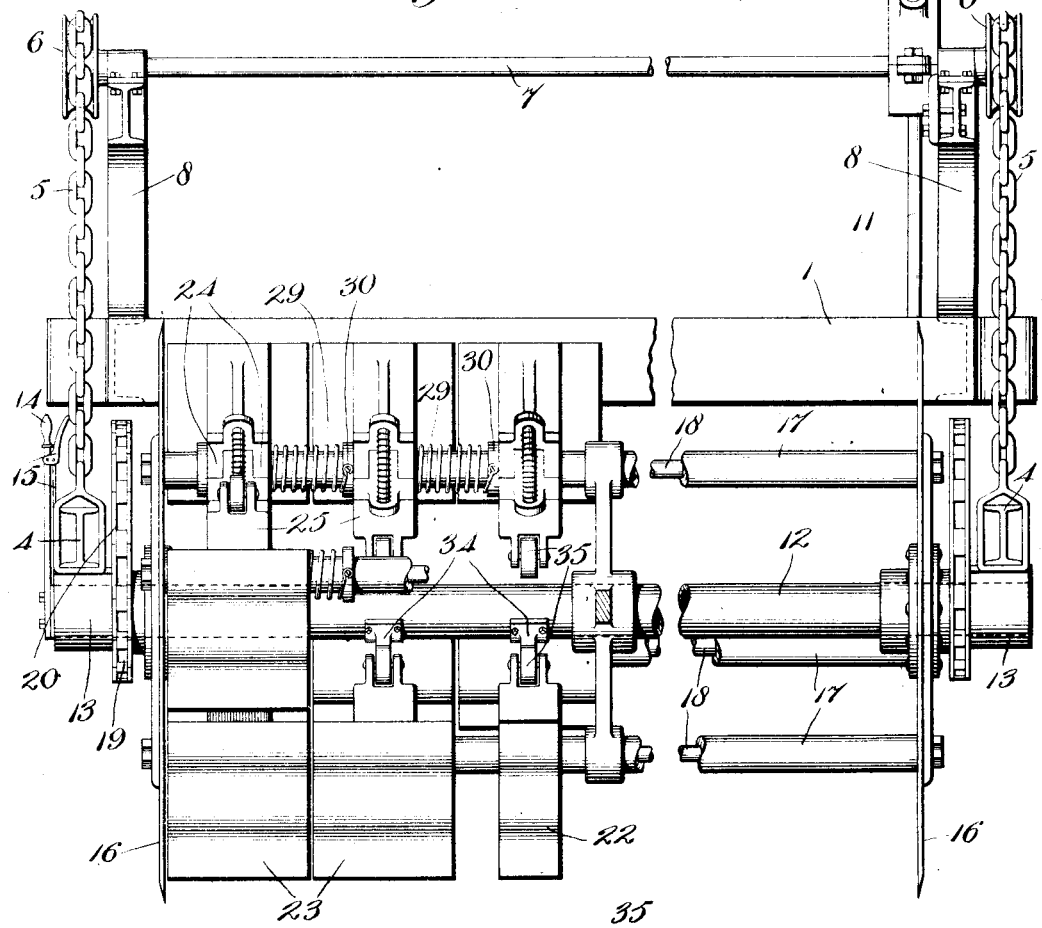
Figure 3:
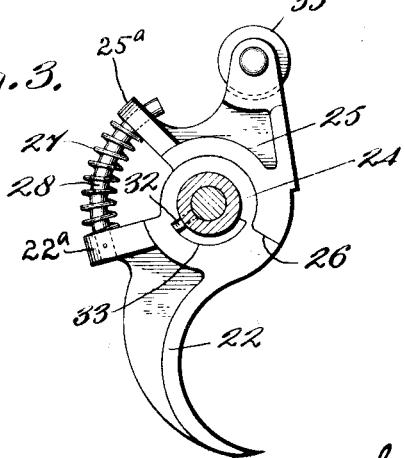

In the accompanying drawings forming a part of this application, and in which similar reference symbols indicate corresponding parts in the several views: Figure 1 is a side elevation, illustrating one embodiment of my invention applied to a gasolene tractor; Fig. 2 is a rear view of the plow construction shown in Fig. 1, with parts broken away; and Fig. 3 is an enlarged side view of one of the plow-blade supports and holding members rotatably mounted on a transverse bar of the reel.

Referring to the drawings, 1 indicates the bed of any usual gasolene tractor provided with traction wheels 2 secured to its rear axle 3. Plow beams 4 are rotatably mounted on the axle 3, with their rear ends supported by chains 5 connected to drums 6; said drums being secured to a shaft 7 journaled in frames 8 of the tractor bed 1. Any suitable means can be employed for rotating the drum 6, such as a worm wheel 9 secured to the shaft 7 in mesh with a worm 10 on a rod 11, which latter can be driven from any convenient part of the transmission mechanism of the tractor. A central shaft 12 is rotatably mounted in bearings 13 on the rear ends of said beams 4, and adjustably locked in said bearings by a lever 14 secured to the end of said shaft and carrying any usual latch mechanism 15 for lockingly engaging the adjacent bearing 13. A reel, comprising cutting disks 16 spaced apart by sleeves 17 and rigidly clamped by rods 18, is rotatably mounted on said central shaft 12; said reel being driven by sprocket wheels 19 secured thereto for engagement by sprocket chains 20 leading from drive sprocket wheels 21 on the tractor axle 3.

A series of supports 22 for the plow blades 23 is provided with spaced lugs 24 rotatably mounted on the sleeves 17 in position for engagement by holding members 25 rotatably mounted on the sleeves 17 between said lugs 24; said supports 22 and members 25 being normally maintained in engagement at their surfaces 26 by strong springs 27 encircling curved rods 28 secured to lugs 22$^a$ on said supports and extending slidably through lugs 25$^a$ on said members. The plow blades 23 are yieldingly swung forwardly to cutting position on the sleeves 17 by springs 29 secured at their respective ends to said supports 22 and to collars 30 rigidly secured on said sleeves; the disks 6 being provided with plates 31 for engaging the adjacent plow blades to limit such forward swing of the latter, and the forward swing of the intermediate plow blades being limited by pin and slot connections 32 and 33 between the blade supports 22 and sleeves 17.

A plurality of cams 34 are secured on the central shaft 12 in position for engaging rollers 35 on the series of holding members 25, for swinging said members to compress the strong springs 27 under sufficient tension between the lugs 22$^a$ and 25$^a$ to maintain the plow blades in their forward cutting position on the sleeves 17 during a portion of the rotation of the plow reel; said springs being formed of sufficient strength and stiffness to, in said compressed condition, strongly lock the plow blades in cutting position during all normal operation of the cultivator, but to yield under the excessive strains exerted on the plow blades upon encountering stones or similar abnormal resistances. The position of the cams 34 is readily varied by adjusting the central shaft 12 in its bearings 13 by the lever 14 and latch 15.

In Fig. 1 of the drawings, one of the holding members is shown at A yieldingly maintained in cutting position against its stop 31 by the spring 29, and the next holding member is shown at B just entering into engagement with the cam 34 for holding the plow blade in cutting position. A holding member 25 is shown at C just leaving the cam 34 upon completion of the cutting stroke of the plow blade, thereby permitting the holding member and plow-blade support to be swung rearwardly to tilting position against the tension of the spring 29 by the weight of the soil engaged thereby. This shifting of the plow blade to the tilting position shown at D causes the soil to be discharged freely therefrom, whereupon the blade will be again swung into cutting position against its stop 31, and the above operation repeated. It will be obvious that, by shifting the cam 34 to engage the holding-member rollers 35 along different portions of the rotation of the plow reel, the cutting action of the plow blades and the extent to which the soil is elevated can be varied to break up the soil to any desired extent.

During normal operation, the strong springs 27 maintain the plow supports 22 and holding members 25 against relative rotation on the sleeves 17, and said springs 27 provide efficient means for permitting the plow blades to yield upon encountering stones or other similar obstructions. The plow blades 23 are secured to their supports 22 in any well known manner, and preferably overlap the abutting faces 26 of said members and supports to effectively shield the latter against entrance of dirt.

I have illustrated and described preferred and satisfactory constructions, but changes could be made within the spirit and scope of my invention.

I claim:—

1. In a rotary plow, the combination of a reel, means for rotatably supporting said reel in contact with the ground, plow blades shiftably mounted on said reel, means for yieldingly maintaining said shiftable blades in cutting position, and means for holding said blades in cutting position through a portion of the rotation of said reel.

2. In a rotary plow, the combination of a reel, means for rotatably supporting said reel in contact with the ground, plow blades shiftably mounted on said reel, means for yieldingly maintaining said shiftable blades in cutting position, and means for yieldingly holding said blades in cutting position through a portion of the rotation of said reel.

3. In a rotary plow, the combination of a reel, means for rotatably supporting said reel in contact with the ground, plow blades shiftably mounted on said reel, means for yieldingly maintaining said shiftable blades in cutting position, means for holding said blades in cutting position through a portion of the rotation of said reel, and adjustable means for shifting the position of said holding means.

4. In a rotary plow, the combination of a reel, means for rotatably supporting said reel in contact with the ground, coöperating plow-blade supports and holding members rotatably mounted on said reel, and means for engaging said holding members through a portion of the rotation of said reel for holding the plow blades in cutting position.

5. In a rotary plow, the combination of a reel, means for rotatably supporting said reel in contact with the ground, plow-blade supports rotatably mounted on said reel, holding members rotatably mounted on said reel for engaging said blade supports, yielding means for normally maintaining said supports and members in engagement, and means for engaging said holding members through a portion of the rotation of said reel for yieldingly holding the plow blades in cutting position.

In testimony whereof, I affix my signature, in presence of two witnesses.

JOHN W. CRAIN.

Witnesses:
J. A. McCourt,
S. T. Davis.